United States Patent
Lin et al.

(10) Patent No.: US 7,154,313 B2
(45) Date of Patent: Dec. 26, 2006

(54) WIDEBAND SPREAD SPECTRUM CLOCK

(75) Inventors: Xintian E. Lin, Mountain View, CA (US); Qinghua Li, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 85 days.

(21) Appl. No.: 10/957,121

(22) Filed: Sep. 30, 2004

(65) Prior Publication Data

US 2006/0066369 A1    Mar. 30, 2006

(51) Int. Cl.
*H03K 3/84* (2006.01)
(52) U.S. Cl. ........................... 327/164; 327/291
(58) Field of Classification Search ............ None
See application file for complete search history.

(56) References Cited

U.S. PATENT DOCUMENTS 6,507,296 B1 *   1/2003   Lee et al. ............... 341/120
6,687,319 B1 *   2/2004   Perino et al. .......... 375/367

* cited by examiner

*Primary Examiner*—Quan Tra
*Assistant Examiner*—Cassandra Cox
(74) *Attorney, Agent, or Firm*—Blakely, Sokoloff, Taylor & Zafman LLP (57) ABSTRACT

A method and apparatus are described. The method comprises generating a clock signal comprising regularly spaced clock-timing transitions between a signal high and a signal low to provide timing for a circuit coupled to the clock signal, and periodicity-disrupting transitions between the signal high and signal low, randomly inserted between the clock-timing transitions to disrupt a periodicity of the regularly spaced clock-timing transitions; and transmitting the clock signal to the circuit.

20 Claims, 10 Drawing Sheets

WIDEBAND SPREAD SPECTRUM CLOCK

FIELD OF THE INVENTION

The present disclosure pertains to the field of digital circuits, and more particularly to methods and apparatuses to reduce the electromagnetic interference (EMI) emissions of clock circuits.

BACKGROUND

Due to increases in the speed at which digital circuits operate, clock circuits that generate reference clocks for digital circuits have to operate at higher frequencies, for example in the 100 MHz range. An artifact of higher frequency clocks circuits is that electromagnetic interference (EMI) emissions as a result of clock signal transmissions can significantly exceed the level of thermal noise. This is a problem because in some technologies receiver sensitivity is approaching the level of thermal noise. For example, the state-of-the-art receiver for receiving 802.11 encoded transmissions as defined by the Institute of Electrical and Electronics Engineer (IEEE), can work at a received power of −96 dBm, whereas the in-band thermal noise is −101 dBm. Further, the state-of-the-art Global System for Mobile Communication (GSM) receiver has a sensitivity of −110 dBm, and the in-band thermal noise is −119 dBm.

One technique to reduce the EMI emissions when transmitting a clock signal is to spread the clock frequency by modulation of the clock period. This technique is known as spread spectrum clocking. The spread is about 0.25–1.5% of the center frequency, and helps to reduce the peak of the emission at the center of frequency. However, the spread spectrum clock still emits electromagnetic interference that is higher than the background noise. For example, on a typical laptop, clock emission is 10–20 db higher than the thermal noise, and thus limits the performance of wireless technologies such as Wireless Local Area Network (WLAN), Wireless Wide Area Network (WWAN), Wireless Personal Area Network (WPAN), using a laptop.

DETAILED DESCRIPTION

The following describes embodiments of a technique to generate a pseudo-random clock, with reduced electromagnetic interference in (EMI) levels.

Apparatus to perform the technique of generating the pseudo-random clock, is also described.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
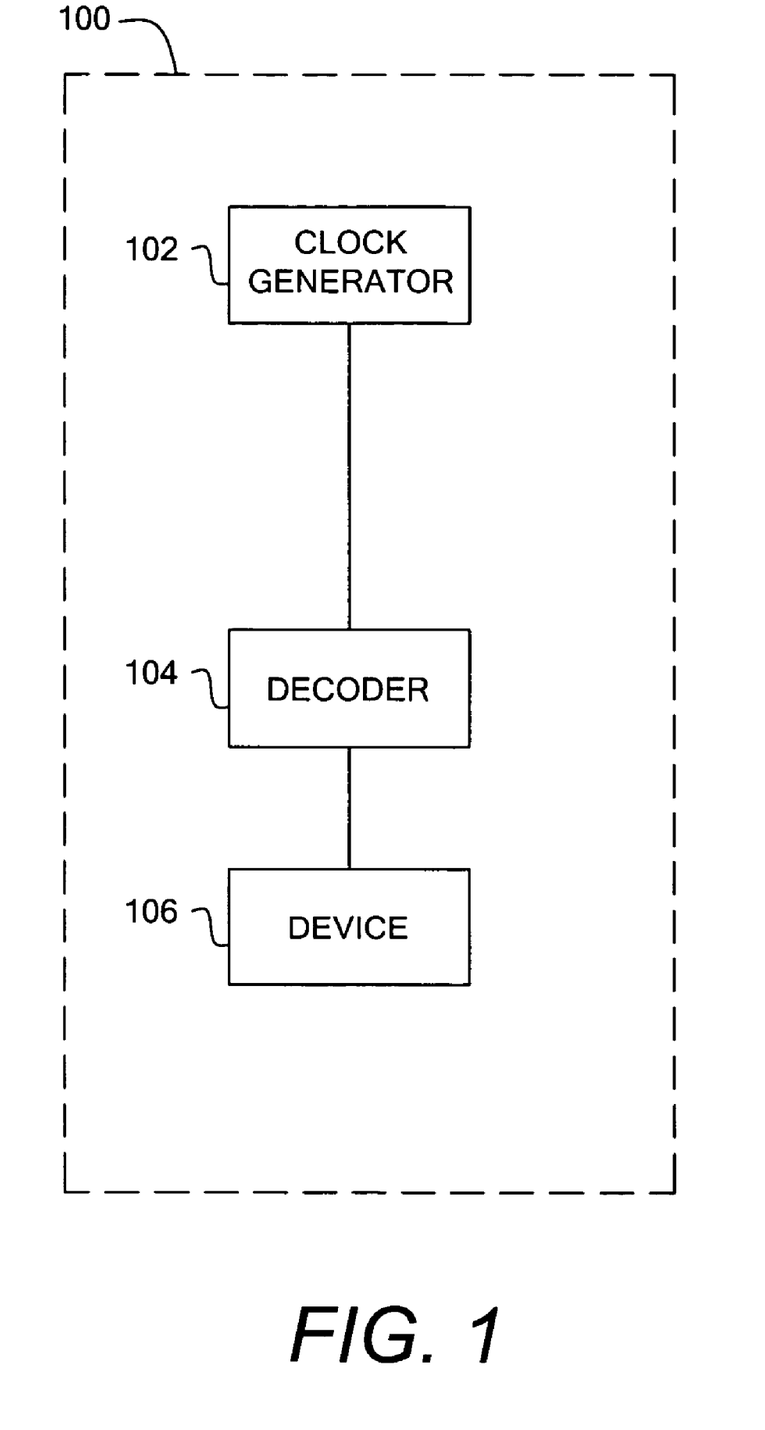
FIG. 1 shows a high-level block diagram of a system which includes a clock generator to generate a pseudo-random clock, in accordance with one embodiment of the invention.

Referring to FIG. 1 of the drawings, reference numeral 100 indicates a system which includes a clock generator 102 which generates and transmits a clock signal to a decoder 104.

The decoder 104 is coupled to a device 106 which includes a digital circuit which is to be synchronized using the clock signal generated by the clock generator 102.

The system 100 may represent a diverse set of electronic devices, for example, a notebook or laptop computer, a personal digital assistant (PDA), cellular telephone, a desktop computer, etc.

The clock generator 102 generates a pseudo-random clock which includes a sequence of regularly spaced timing edges based on a regular clock signal, as well as non-timing edges randomly inserted between the regular timing edges. Thus, the clock generator 102 may be seen as an apparatus that generates a pseudo-random clock signal comprising a sequence of regularly spaced timing edges based on a regular clock signal, and non-timing edges randomly inserted between the regular timing edges.

The decoder 104 decodes the pseudo-random clock signal generated by the clock generator 102 to recover the regular clock signal from the pseudo-random clock signal, without a phase-lock loop circuit, as will be explained in greater detail below. Thus, the decoder 104 represents an apparatus to recover the regular clock signal from the pseudo-random clock signal, without using a phase-lock loop circuit.

Figure 2:
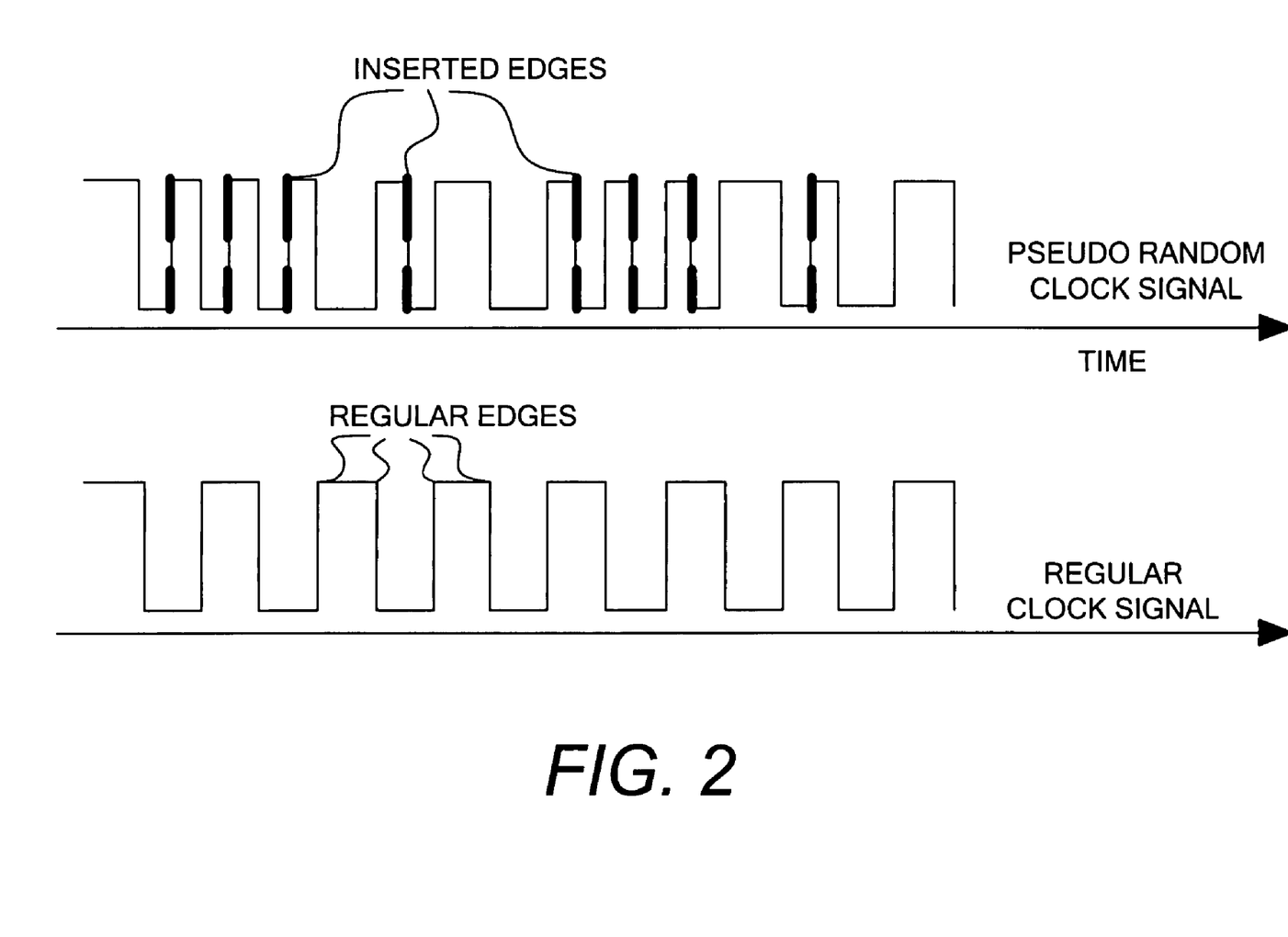
FIG. 2 shows the waveform of a regular clock, and a pseudo-random clock, generated in accordance with one embodiment of the invention.

As can been seen from FIG. 2 of the drawings, the regular clock signal comprises a waveform which includes a plurality of signal highs, a plurality of signal lows, and regular edges or transitions between the signal highs and signal lows. Further, as can be seen from FIG. 2 of the drawings, the pseudo-random clock generated by the clock generator 102, in accordance with one embodiment of the invention, includes a number of inserted edges 200 that are inserted between the regular edges/transitions of the regular clock signal. The purpose of inserting the edges 200 is to disrupt the periodicity of the regular edges of regular clock signal.

Figure 3:
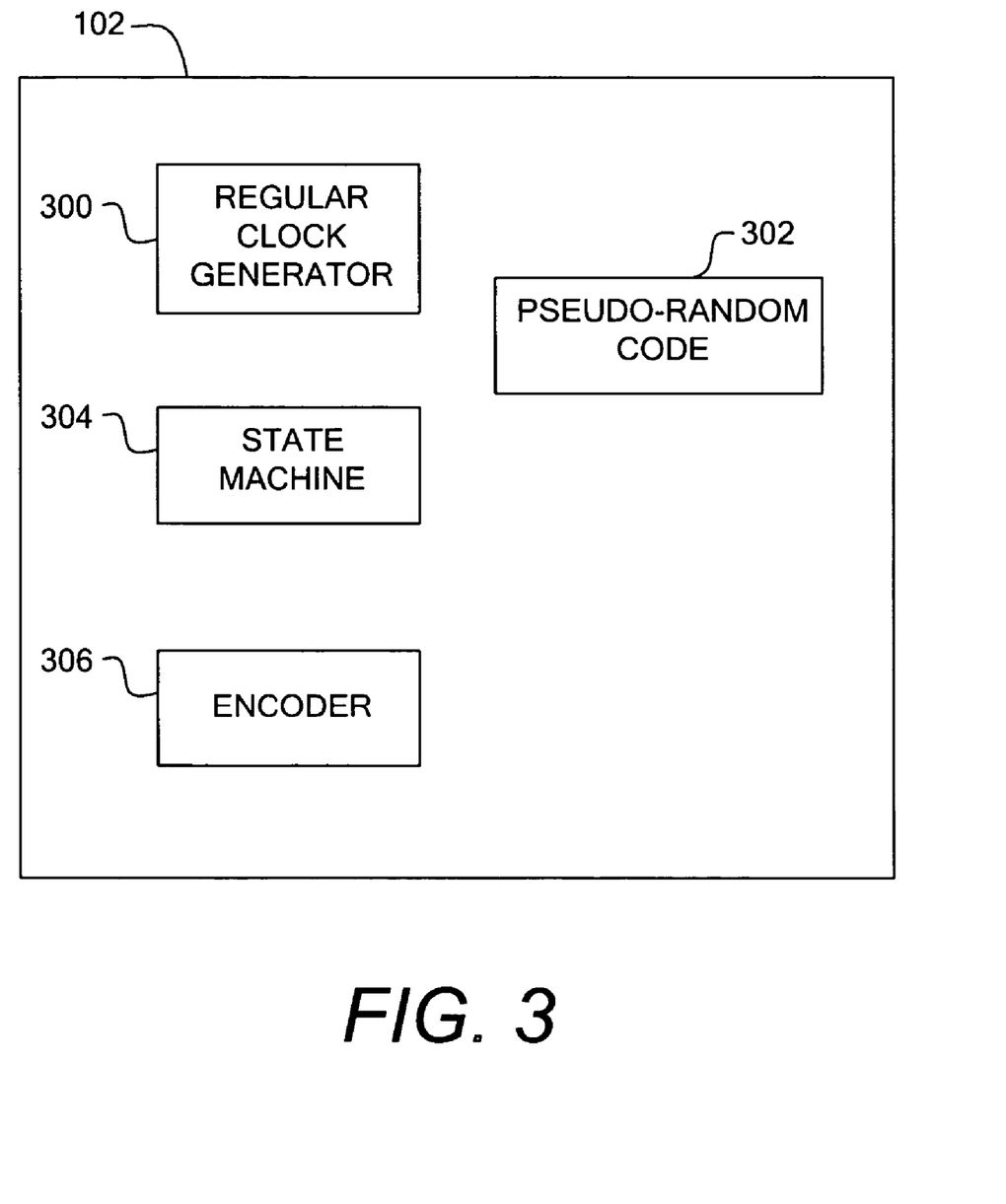
FIG. 3 shows the functional components of the clock generator of FIG. 1, in accordance with one embodiment of the invention.
Figure 4:
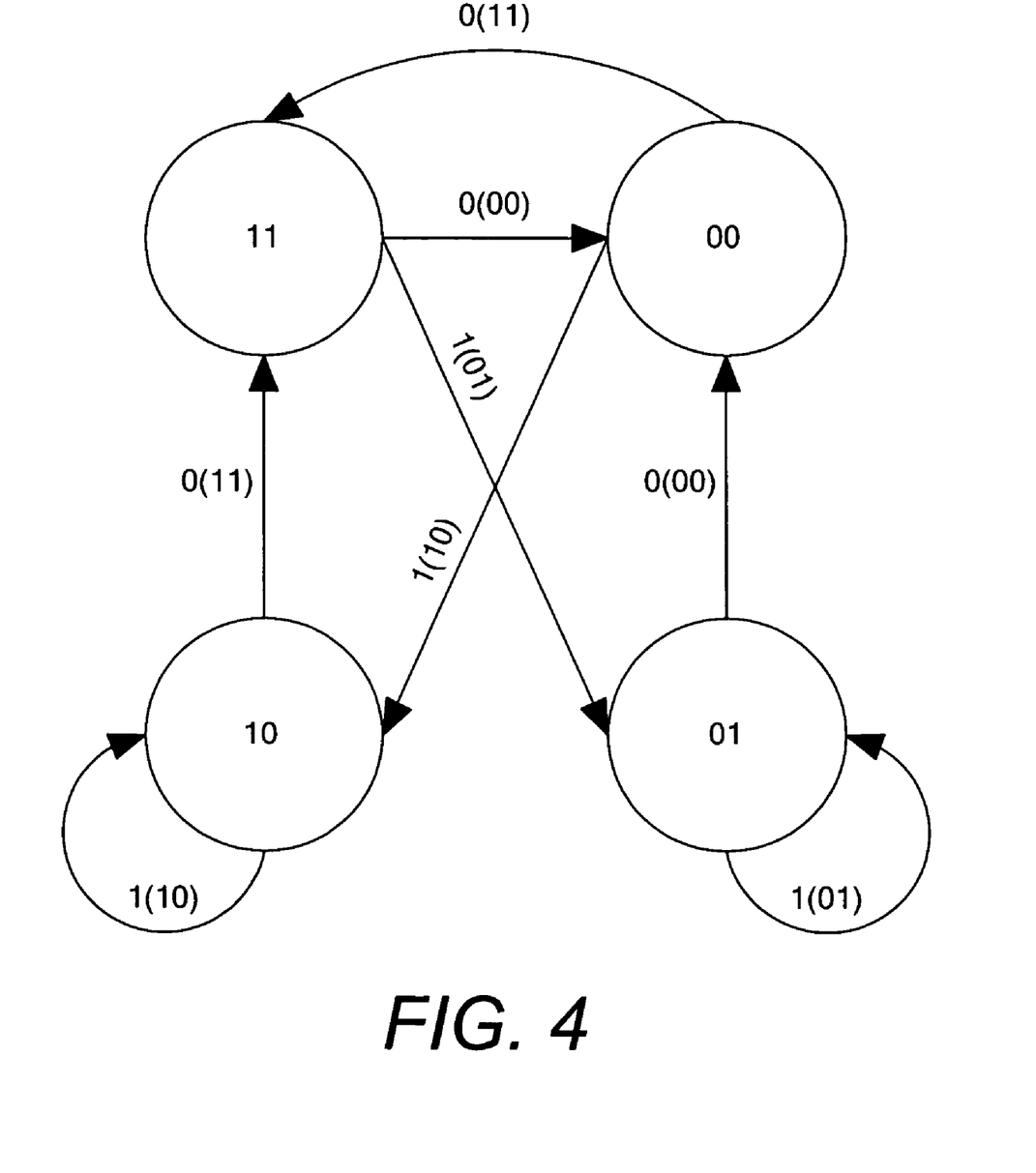
FIG. 4 shows one embodiment of the state machine of FIG. 3.

In one embodiment, the clock generator 102 includes the components shown in FIG. 3 of the drawings. These components include a regular clock generator 300 to generate a regular clock signal, such as is shown in FIG. 2 of the drawings, a state machine 302, a pseudo-random code 304, and an encoder 306. In one embodiment, the state machine 302 may be represented by the state diagram shown in FIG. 4 of the drawings. As can be seen, the state diagram includes four states labeled "11", "00", "10" and "01", respectively. Each of the states in the state diagram of FIG. 4 represents a two-pulse waveform pattern, where a "1", indicates a signal high, and a "0", indicates a signal low. Thus, for example, the "11" state corresponds to a waveform pattern in which the two pulses are at a signal high, whereas the "01", state corresponds to a two-pulse waveform, where the first pulse is at a signal low, and the second pulse is at a signal high.

The state diagram of FIG. 4, also shows the legal/permissible state transitions between the various states. For example, as will be seen from the "11" state, only 2 legal/permissible state transitions are possible, i.e. first transition to the "00" state, and a second transition is to the "01" state.

Figure 5:
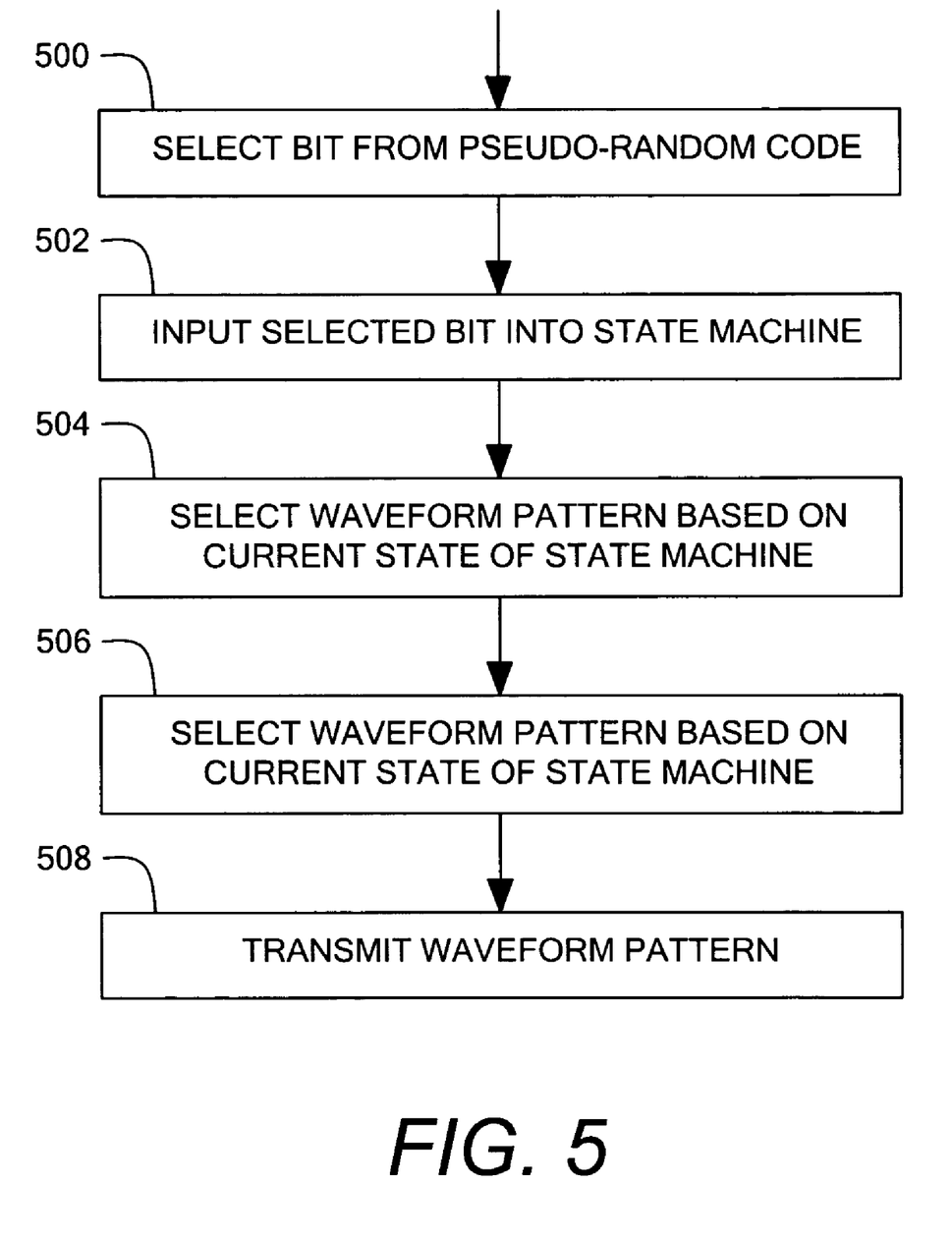
FIGS. 5 and 8 show operations performed in order to generate a pseudo-random clock, in accordance with one embodiment of the invention.

FIG. 5 of the drawings illustrates how the state machine 302, the regular clock generator 300, and the pseudo-random code 304 may be used, in one embodiment, to generate a pseudo-random clock such as is shown in FIG. 2 of the drawings. The operations shown in FIG. 5 of the drawings are performed for each timing edge in the regular clock signal generated by the regular clock generator 300. Referring to FIG. 5, at block 500, a bit is selected from the pseudo-random code 306. In one embodiment, the pseudo-random code may be a 7-bit long sequence of zeros and ones. In order to maximize the randomness of the pseudo-random code, in one embodiment, the pseudo-random code may comprise a gold sequence, e.g. a 7-bit gold sequence. At block 502, the selected bit is input into the state machine 302. In one embodiment, the state machine is configured with an arbitrary start state. For example, the start state may be the "11" state. For each bit input into the state machine, the state machine transitions to a "current" state as follows:

(a) from the "11" state an input bit of zero transitions the state machine to the "00" state, whereas an input bit of one transitions the state machine to be "01" state;

(b) from the "00" state, an input bit of zero transitions the state machine to the "11" state, whereas an input bit of one transitions the state machine to the "10";

(c) from the "01," state, an input bit of zero transitions state machine to the "11" state, whereas an input bit of one leaves the state machine in the "10"; and (d) from the "01" state, an input bit of zero transitions state machine to the "00" state, whereas an input bit of one leaves the state machine in the "01" state.

At block 504, a waveform pattern is selected based on the current state of the state machine. For example, if the state machine is in the "01" state, then the waveform pattern comprises a low pulse followed by a high pulse, whereas if the state machine is in the "10" state, then the waveform pattern comprises a high pulse followed by a low pulse. At block 506, the selected waveform pattern is transmitted after being encoded by the encoder 306. Thus, it will be seen that if the state machine receives a repeated sequence of [11101001110100], which is a repetition of sequence, then the output from the state machine will be [01010100011001010101011010011]. The above output sequence is pseudo-random, but has the unique property that all clock edges of the regular input clock signal are present, although not necessarily in the same transition direction. Further, there are no sequences of three or more zeros or ones in the output sequence.

Figure 6:
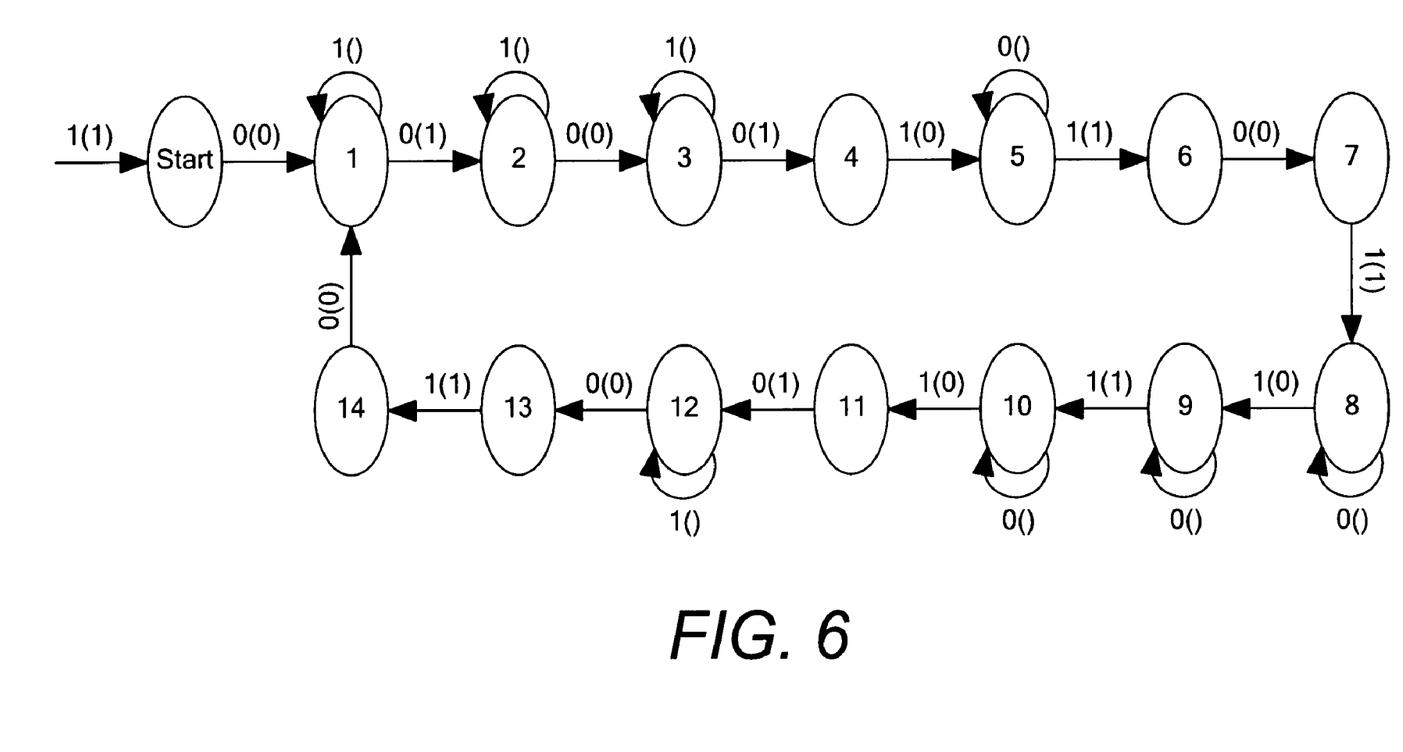
FIG. 6 shows one embodiment of a state machine embodied in the decoder of FIG. 1.
Figure 7:
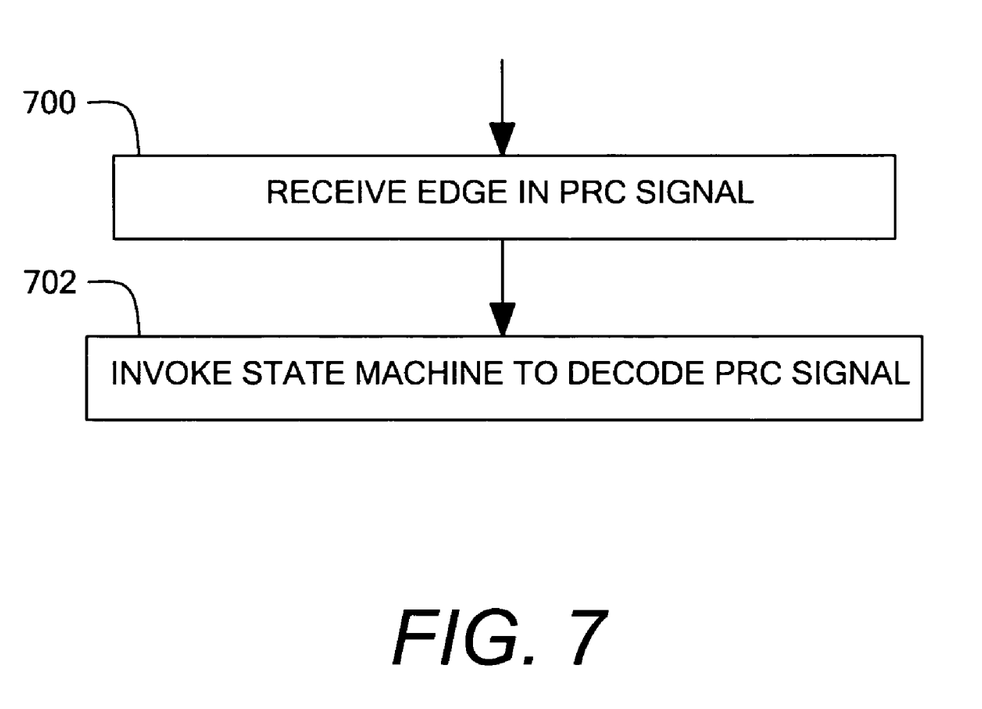
FIGS. 7 and 9 show operations performed to recover a regular clock signal from a pseudo-random clock, in accordance with one embodiment of the invention.

The above output sequence appears to the decoder 104 as the following asynchronous sequence: [010101010101010101]. To decode the above asynchronous sequence, in one embodiment, the decoder 104 includes a state machine corresponding to the state diagram shown in FIG. 6 of the drawings. Referring to the state diagram of FIG. 6, the input and output bits are shown on the transition lines between the states. For example, the first 1 (high) bit starts the state machine and an output of 0 produces an output of zero and the state machine moves to state 1. In state 1, an input bit of 1 causes the state machine to move to a 1p state without outputting a bit. From the 1p state, the state machine transitions to state 2 with an input of 0 to produce an output of 1. It will be seen that the state diagram of FIG. 6 may be used by the decoder 104 to decode the asynchronous psuedo-random clock to produce a regular clock signal in which the inserted edges are removed or dropped. The 1p, 2p, 3p, and 5p states are required to effectively drop or ignore the inserted non-timing edges.

Figure 8:
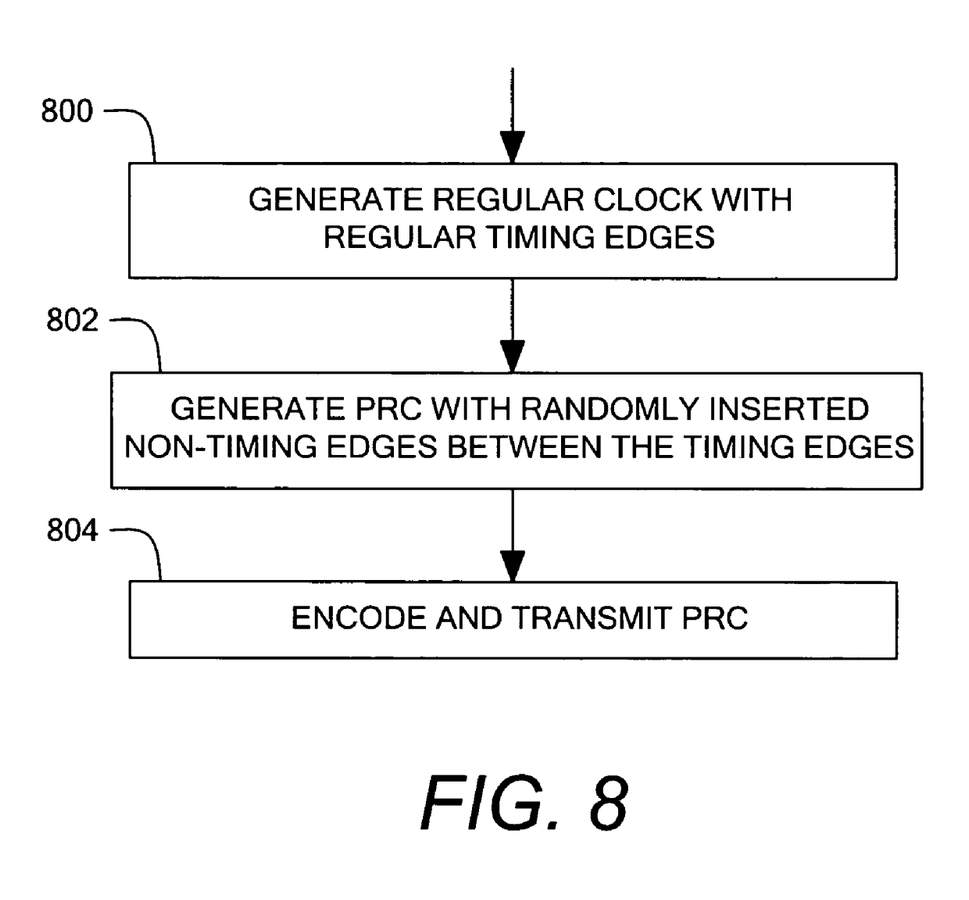

Thus, in one embodiment, the decoder 104 performs a method illustrated in FIG. 8 of the drawings, which includes a block 800 receiving an edge in the pseudo-random clock (PRC) signal, and invoking the state machine to decode the PRC signal at block 702, as described above.

Broadly, in one embodiment, the clock generator 102 may be seen to perform the method illustrated in FIG. 8 of the drawings which includes generating a regular clock with regular timing edges at block 800, generating a pseudo-random clock with randomly inserted non-timing edges between the timing edges, at block 802, and encoding and transmitting the PRC at block 804.

Figure 9:
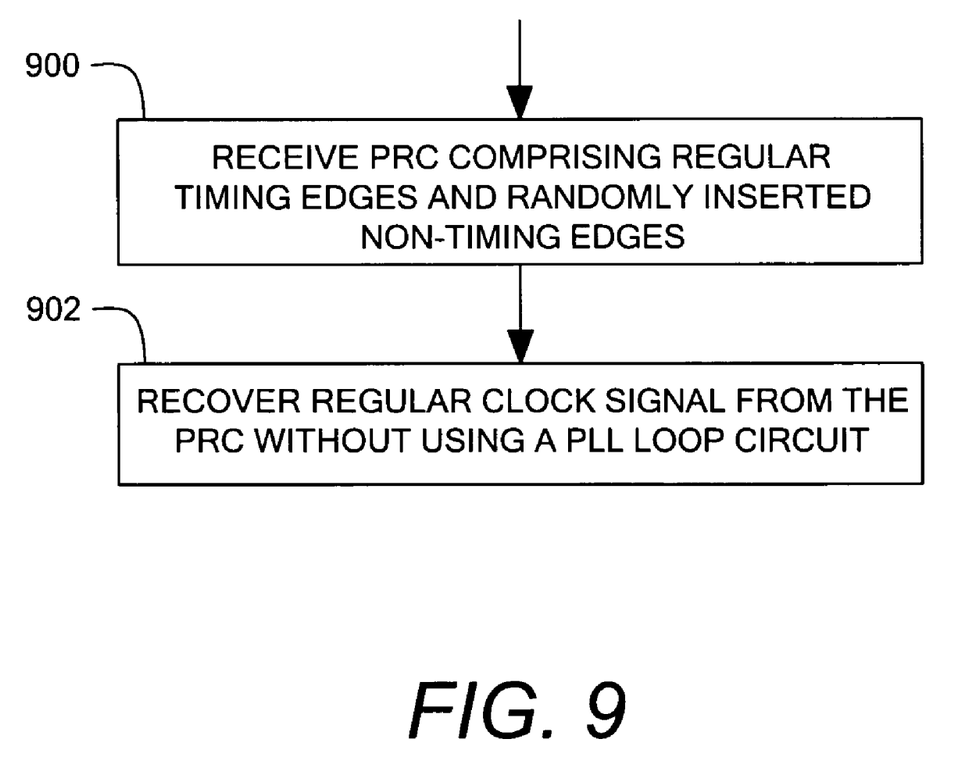

Further, in one embodiment, the decoder 104 may be seen to broadly perform the operations shown in FIG. 9 of the drawings, which includes receiving the PRC comprising regular timing edges and randomly inserted non-timing edges at block 900, and recovering the regular clock signal from the PRC without using a phase-lock loop circuit, at block 902.

Figure 10:
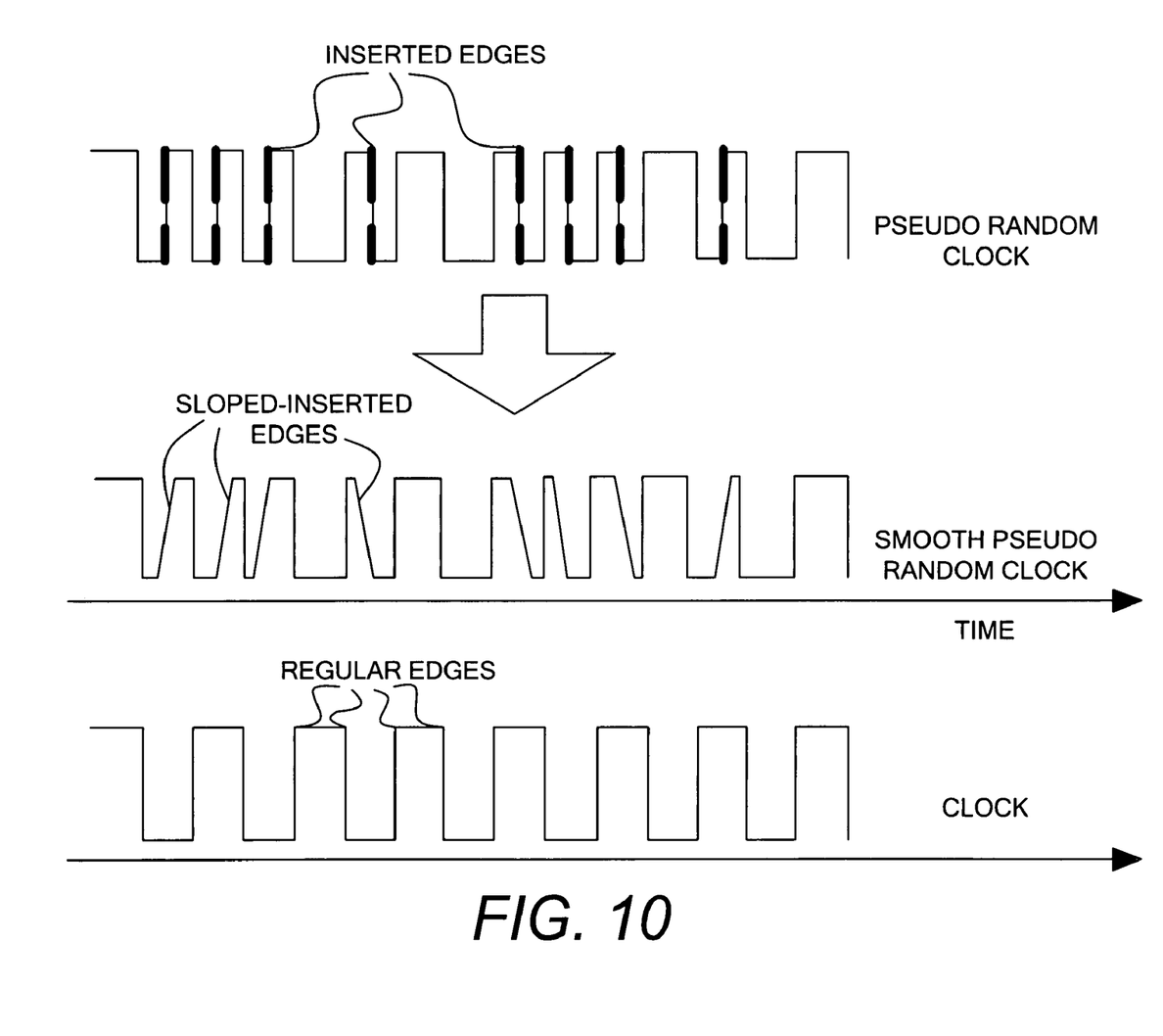
FIG. 10 shows an embodiment of a pseudo-random clock generator in accordance with embodiments of the invention, in which the inserted edges are sloped

In one embodiment, the clock generator 102 may jitter or vary the period of the inserted non-timing edges in the pseudo-random clock. The waveform of a pseudo-random clock in which the inserted non-timing edges are jittered as illustrated FIG. 10 of the drawings. By jittering the non-timing edges, a smoother energy spectrum in the frequency domain may be obtained. For example, nulls at even multiples of the fundamental clock frequency may no longer be present in the clock spectrum. In one embodiment, the inserted non-timing edges may be inclined or sloped to reduce the high frequency energy of the signal.

The pseudo-random clock described herein replaces the spectrum peaks of the harmonics of the fundamental frequency by many smaller peaks, which fills in the gaps between the harmonics. The techniques disclosed herein may be combined with current spread spectrum clock techniques to further spread individual peaks.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
generating a clock signal comprising regularly spaced clock-timing transitions between a signal high and a signal low to provide timing for a circuit coupled to the clock signal, and periodicity-disrupting transitions between the signal high and signal low, randomly inserted between the clock-timing transitions to disrupt a periodicity of the regularly spaced clock-timing transitions;
jittering at least some of the randomly inserted periodicity-disrupting transitions; and
transmitting the clock signal to the circuit.

2. The method of claim 1, further comprising recovering the regularly spaced clock-timing transitions from the clock signal without using a phase-locked loop circuit.

3. The method of claim 1, wherein generating the output clock signal comprises generating a two-pulse waveform for each timing edge of the input clock signal.

4. The method of claim 3, wherein generating the two-pulse waveform comprises selecting the two-pulse waveform from the group consisting of a "00", "01", "10", and a "11" waveform pattern, where a "1" indicates a signal high and a "0" indicates signal low.

5. The method of claim 4, wherein selecting the two-pulse waveform comprises inputting a pseudorandom number into the state machine for each timing edge of the input clock signal and selecting the two-pulse waveform pattern corresponding to a state of the state machine after the inputting.

6. The method of claim 5, wherein the pseudo-random number is a bit, and inputting the pseudo-random number comprises selecting the bit from a gold sequence.

7. A method, comprising: receiving an input clock signal comprising a plurality of timing edges; and
generating an output clock signal comprising the timing edges of the input clock signal and non-timing edges randomly inserted between the timing edges,
wherein generating the output clock signal comprises generating a two-pulse waveform for each timing edge of the input clock signal wherein the two-pulse waveform comprises at least two or more sequential bits.

8. The method of claim 7, wherein generating the two-pulse waveform comprises selecting the two-pulse waveform from the group consisting of a "00", "01,", "10", and a "11" waveform pattern, where a "1" indicates a signal high and a "0" indicates signal low.

9. The method of claim 8, further comprising realizing a state machine comprising states corresponding to the "00", "01", "10", and "11" waveform patterns and permitted transitions between the states.

10. The method of claim 9, wherein selecting the two-pulse waveform comprises inputting a pseudo-random number into the state machine for each timing edge of the input clock signal and selecting the two-pulse waveform pattern corresponding to a state of the state machine after the inputting.

11. The method of claim 10, wherein the pseudo-random number is a bit, and inputting the pseudo-random number comprises selecting the bit from a gold sequence.

12. The method of claim 7, further comprising jittering the non-timing edges.

13. A method, comprising:
receiving a pseudo-random clock signal comprising a plurality of timing edges and the plurality of non-timing edges randomly inserting between the timing edges to disrupt a periodicity of the timing edges; and
processing the pseudo-random clock signal to recover a regular clock signal comprising the timing edges, the non-timing edges being removed, wherein the processing is without a phase-locked loop circuit,
wherein the processing is based on a state machine.

14. Apparatus, comprising:
a mechanism to generate a regular clock signal comprising a sequence of regularly spaced timing edges; and
a mechanism to generate a pseudo-random clock signal comprising the timing edges of the regular clock signal and non-timing edges randomly inserted between the timing edges,
wherein the mechanism to generate the pseudo-random clock signal generates a two-pulse waveform for each timing edge of the regular clock signal wherein the two-pulse waveform comprises at least two or more sequential bits.

15. The apparatus of claim 14, wherein the mechanism to generate the pseudo-random clock signal generates the two-pulse waveform by selecting the two-pulse waveform from the group comprising a "00", "01,", "10", and a "11" waveform pattern, where a "1" indicates a signal high and a "0" indicates signal low.

16. The apparatus of claim 14, wherein the mechanism to generate the pseudo-random clock signal comprises a state machine comprising a state corresponding to the "00", "01", "10", and "11" waveform patterns and permitted transitions between the states.

17. The apparatus of claim 15, wherein the mechanism to generate the pseudo-random clock signal selects the two-pulse waveform by inputting a pseudo-random number into the state machine for each timing edge of the input clock signal and selecting the two-pulse waveform pattern corresponding to a state of the state machine after the inputting.

18. The apparatus of claim 17, wherein the pseudo-random number is a bit, and inputting the pseudo-random number comprises selecting the bit from a gold sequence.

19. A system, comprising:
an apparatus to generate a pseudo-random clock signal comprising a sequence of regularly spaced timing edges based on a regular clock signal, and non-timing edges randomly inserted between the regular timing edges, wherein a frequency of the pseudo-random clock signal is twice that of the input regular clock signal; and
an apparatus to recover the regular clock signal from the pseudo-random clock signal, without using a phase-locked loop circuit.

20. The system of claim 19, wherein the apparatus to generate the pseudo-random clock signals jitters the randomly inserted timing edges.

* * * * *